April 21, 1970 R. S. PETERSON 3,508,132
POWER PEAK LIMITING CONTROL FOR DIRECT CURRENT DRIVES
Filed June 19, 1968 2 Sheets-Sheet 1
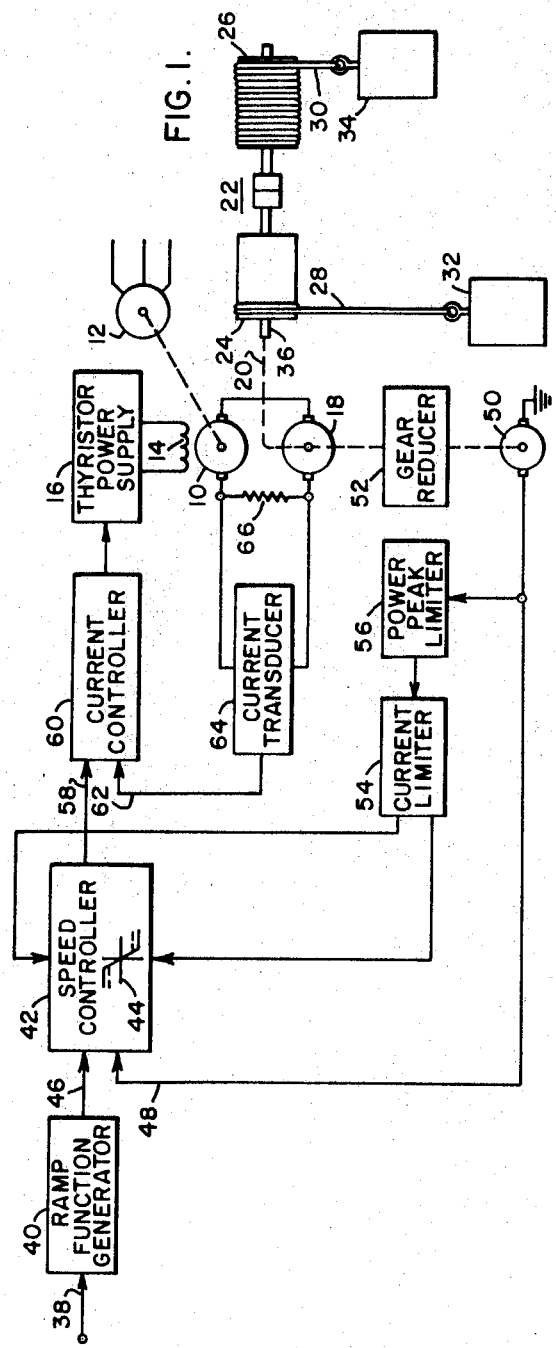
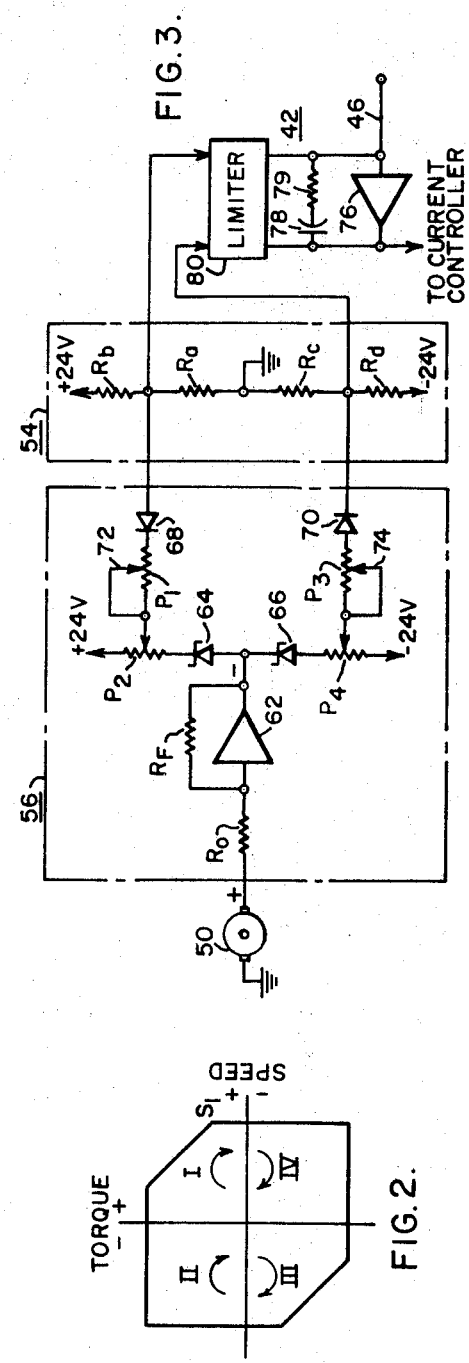
WITNESSES:
Bernard R. Gieguay
James G. Young
INVENTOR
Robert S. Peterson
BY [signature]
ATTORNEY

United States Patent Office 3,508,132
Patented Apr. 21, 1970

3,508,132
POWER PEAK LIMITING CONTROL FOR
DIRECT CURRENT DRIVES
Robert S. Peterson, Williamsville, N.Y., assignor to Westinghouse Electric Corporation, Pittsburgh, Pa., a corporation of Pennsylvania
Filed June 19, 1968, Ser. No. 738,297
Int. Cl. H02p 1/00, 3/00
U.S. Cl. 318—271                                10 Claims

ABSTRACT OF THE DISCLOSURE

Described is a motor control system employing conventional voltage and current regulators, and additionally including means for modifying the current limit of the system as a function of motor voltage or speed. In accordance with the invention, the power peak limiting feature is effective only during motoring conditions to avoid input power peaks, but not effective during regeneration conditions to afford maximum braking effect.

BACKGROUND OF THE INVENTION

There are certain applications for direct current motor drives where momentary surges of power into the motor will cause severe voltage dips in the electrical distribution system feeding the motor. For example, the distribution system feeding the motor for a mine hoist at a remote location may be underrated; and power peaks or surges required by the drive motor for the hoist can cause cyclic, severe alternating current line voltage dips. To minimize these line voltage dips, the positive power peaks must be reduced without reducing the mine hoist production.

In the past, this problem was solved by using a flywheel motor-generator set driven by an alternating current motor coupled to the distribution system, the inertia of the flywheel acting to absorb power peaks. This approach, however, is expensive and, of course, is not applicable to thyristor-powered direct current drives. Other systems have employed well known rotating regulator devices; however these are somewhat slow with less than optimum speed regulation.

SUMMARY OF THE INVENTION

As one object, the present invention seeks to provide a motor control system for direct current motors which reduces positive power peaks when the motor is operating under motoring conditions but not when the motor is operating under regeneration conditions. In this manner, positive power peaks in the distribution system which cause line voltage dips are avoided; however the braking ability of the motor under regeneration conditions is not impeded. The regenerative power peaks are usually not objectionable since the line voltage at this time has a tendency to be maintained at the no-load voltage level or to rise slightly.

Another object of the invention is to provide a power peak limiting controller wherein power peak limiting modifies the current limit as a function of motor speed. If a voltage regulator is used instead of a speed regulator to control the speed of the drive motor, the power peak limiting control modifies the current limit as a function of motor terminal voltage. The current limit is set at its maximum value at low drive speeds where the demand on the distribution system is low, thus permitting the drive motor to accelerate the load at its maximum capability at low drive speeds. The current limit is only reduced at high drive speeds which, in turn, reduces the power demand on the distribution system.

Still another object of the invention is to provide a power peak limiting controller which is faster in operation and cheaper in construction than prior art devices of this type.

In accordance with the invention, a motor control system is provided comprising a speed controller having an adjustable maximum output, a current controller responsive to current through the motor coupled to the output of the voltage reference controller, and a thyristor power amplifier coupled to the output of the current controller for varying the voltage and current supplied to the motor. This part of the control system is, of course, conventional. However, the system additionally includes means for generating a signal which varies as a function of the speed of the motor, means responsive to that signal for generating a voltage which varies proportionally to speed only after the speed of the motor exceeds a predetermined level, and means responsive to said voltage for varying the maximum output of said speed controller.

In one illustrative embodiment of the invention, the signal which varies as a function of the speed of the motor is generated by a tachometer coupled to the motor shaft. This signal, in the form of a voltage, is compared with a fixed voltage; and when the voltage from the tachometer exceeds the fixed voltage, the maximum output of the speed controller is reduced progressively as motor speed increases.

The above and other objects and features of the invention will become apparent from the following detailed description taken in connection with the accompanying drawings which form a part of this specification, and in which:

DESCRIPTION OF THE DRAWINGS

FIGURE 1 is a block diagram of an illustrative embodiment of the motor control system of the invention;

FIG. 2 illustrates an ideal torque-speed curve incorporating the power peak limiting feature of the invention;

FIG. 3 is a detailed schematic diagram of the power peak limiter and current limit circuitry of the invention;

DESCRIPTION OF A PREFERRED EMBODIMENT

Figure 4:
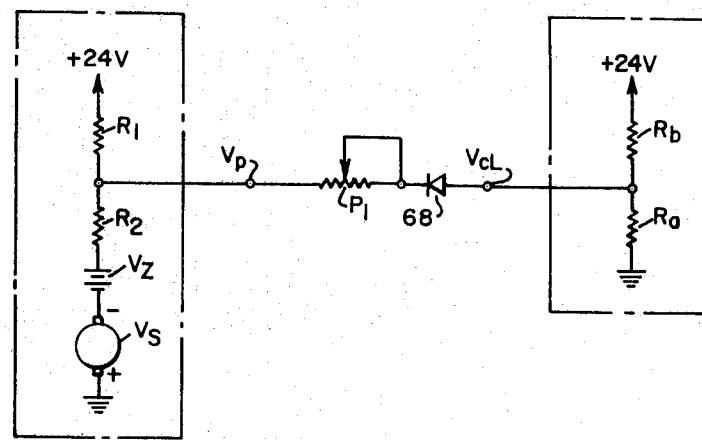
FIGS. 4 and 5 are equivalent circuit diagrams for the circuitry shown in FIG. 3 and included herein for purposes of explanation.

With reference now to the drawings, and particularly to FIG. 1, a conventional Ward-Leonard system is shown comprising a direct current generator 10 coupled to a three-phase alternating current drive motor 12 which is, in turn, supplied with power from an external distribution system, not shown. The generator 10 is provided with field winding 14 coupled to a thyristor power supply 16, the arrangement being such that the output from the generator 10 will be a function of the field established by the thyristor power supply 16. The output of the generator 10 is then applied to a direct current motor 18 coupled through a mechanical linkage 20 to a mine hoist assembly, generally indicated at 22.

The particular mine hoist assembly shown herein is illustrative of only one type of load to which the motor 18 can be connected. It includes a pair of drums 24 and 26 around which are wound cables 28 and 30, respectively. Suspended from the cables 28 and 30 are containers 32 and 34 which can be used to elevate or lower men or material into and out of the mine. The cables 28 and 30 are wound upon the drums 24 and 26 such that when the motor 18 rotates the shaft 36 on which the drums are mounted in a clockwise direction, for example, the container 32 will be elevated while container 34 descends. Similarly, counterclockwise rotation of the shaft 36 will cause the container 34 to be elevated and container 32 to descend.

As will be understood, the torque on the motor 18 will be dependent upon the relative weights of the materials in containers 32 and 34. For example, if container 32 is being elevated and contains material heavier than that in container 34, a positive torque will have to be applied to the shaft 36 by the motor 18. On the other hand, if the material in container 34 is heavier than that in container 32, the motor 18 will impart a braking effect under regeneneration conditions.

While a Ward-Leonard system has been shown herein for purposes of illustration, it should be understood that the generator 10 could be eliminated if desired and the motor 18 driven directly by a thyristor power supply coupled to the main distribution system and operated in accordance with conventional phase modulation techniques. That is to say, a thyristor power supply coupled directly to the motor 18 rather than the field winding of generator 10 is, in effect, equivalent to the Ward-Leonard system shown herein.

Input control signals for the motor 18 are applied to input terminal 38 and thence to a ramp function generator 40 which will convert a step input, for example, into a ramp output. The resulting signal from the ramp function generator 40 is applied to a speed controller 42 having a static gain curve represented by the illustrative curve 44. As can be seen, the static gain of the circuit gradually increases in the positive or negative direction, depending upon the polarity of the input signal, until it reaches a point of saturation. Furthermore, the saturation point can be varied upwardly or downwardly as shown, for example, by the dotted lines on the gain curve 44 for circuit 42.

The inputs to the speed controller 42 are both the input ramp control voltage on lead 46 and a feedback voltage on lead 48 representing motor speed. The voltage on lead 48, in turn, is generated by a tachometer generator 50 coupled through a gear reducer 52 to the shaft of motor 18. When the voltages on leads 46 and 48 do not cancel, the speed controller 42 integrates the difference and the output will increase until the saturation limit is reached in either the positive or negative direction. When the drive motor speed matches the speed reference signal on terminal 46, the speed controller comes out of saturation and settles down to a current reference signal to the current loop which matches the current demanded by the drive load. These speed controller saturation limits, in turn, are set by a current limiter 54 coupled to the output of a power peak limiter 56 responsive to the output voltage from the tachometer 50 in a manner hereinafter described.

The output from the speed controller 42 on lead 58 is one input into a current controller 60. The other input to the current controller on lead 62 is a feedback current from a current transducer 64. The input to the current transducer 64, in turn, is a voltage developed across a resistance 66 in the circuit between generator 10 and motor 18. When the two inputs on leads 58 and 62 do not cancel each other, the current controller 60 integrates the difference and its output changes the field of generator 10 and the current fed to motor 18 until the difference is zero. Thus, the motor current is made to match the current indicated by the speed controller 42. The current can only get as large as the speed controller output which is limited by saturation. When the speed controller is in saturation, its output is constant and, therefore, so also is the regulated current.

The ideal torque-speed curve for the motor 18 is shown in FIG. 2. It will be assumed that in quadrant I, for example, the motor 18 is rotating in a clockwise direction. Under these circumstances, a positive torque is supplied to the motor and it is operating under motoring conditions. However, as motor speed increases above a predetermined level $S_1$, the maximum torque (i.e., current into the motor) is gradually reduced to thereby eliminate the undesirable power peaks discussed above. In quadrant II, the motor is still rotating in a clockwise direction, but the torque is negative, meaning that the motor is operating under regeneration conditions. In order to afford maximum braking under these conditions, ideally there is no modification to the current limit in the second quadrant.

Now, when the motor is operating in the third and fourth quadrants, its direction of rotation is reversed. In the third quadrant, the motor is operating under motoring conditions, and current limit modification as a function of motor speed is employed as shown in FIG. 2; whereas in the fourth quadrant, the motor is again operating under regeneration conditions is again operating under regeneration conditions and no curret limit modification is employed. In the latter case, the current limit is a constant value as shown in the second and fourth quadrants of FIG. 2.

The power peak limiter 56 and current limiter 54 are shown in detail in FIG. 3. The output from the tachometer generator 50 is applied through resistor $R_o$ to the input of an operational amplifier 62 having a feedback path including resistor $R_f$. The output of the operational amplifier 62 is applied through Zener diode 64 and rheostat $P_2$ to a source of +24 volts. Similarly, the output of the operational amplifier 62 is applied through Zener diode 66 and rheostat $P_4$ to a source of −24 volts. The movable tap on rheostat $P_2$ is connected through variable resistor $P_1$ and diode 68 to the junction of voltage dividing resistors $R_a$ and $R_b$. One end of resistor $R_a$ is grounded as shown; whereas one end of resistor $R_b$ is connected to a source of +24 volts.

In a similar manner, the movable tap on rheostat $P_4$ is connected through variable resistor $P_3$ and diode 70 to the junction of voltage dividing resistors $R_c$ and $R_d$ in the current limiter 54. One end of resistor $R_c$ is grounded; whereas one end of resistor $R_d$ is connected to a source of −24 volts. The effective resistance of resistors $P_1$ and $P_3$ can be varied by means of the movable taps 72 and 74, as will be understood.

Let us assume, that the signal from the tachometer generator 50 is positive when the motor is rotating in clockwise direction and operating in quadrant I of FIG. 2. Under these circumstances, the output of the operational amplifier is negative; and current flows through the Zener diode 64 in the reverse direction to the source of +24 volts. As a result, the Zener diode acts as a constant voltage source similar to a battery. On the other hand, if the output of the tachometer generator 50 should be negative, the output of the operational amplifier 62 will be positive and Zener diode 66 and rheostat $P_4$ come into play.

An equivalent circuit for circuits 54 and 56 is shown in FIG. 4 where the resistances $R_1$, $R_2$ are equal to the total resistance of the resistor $P_2$ shown in FIG. 3. Furthermore, the voltage $V_z$ indicates the constant voltage source provided by the Zener diode 64; while the voltage $V_s$ is equal to:

$$-\frac{R_f}{R_o} \times V_z$$

where $V_g$ is the voltage output of the tachometer generator 50.

Figure 5:
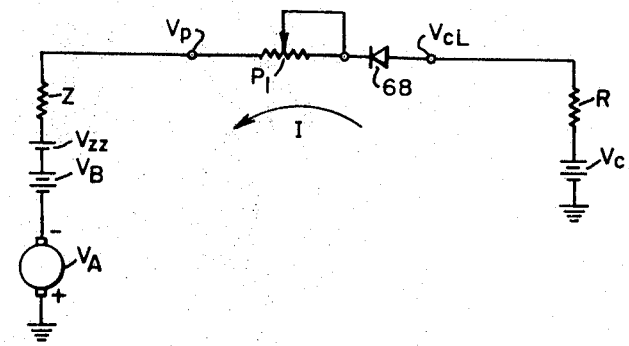

The equivalent circuit of FIG. 4 can be further reduced to the equivalent circuit of FIG. 5 where, in the peak power limiter 56 looking from point $V_p$:

(1) $$Z = \frac{R_1 R_2}{R_1 + R_2}$$

(2) $$V_{zz} = \frac{V_z Z}{R_2}$$

(3) $$V_A = \frac{V_s Z}{R_2}$$

(4) $$V_B = \frac{24 Z}{R_1}$$

In the current limiter circuit 54, looking from point $V_{cL}$, R and $V_c$ can be expressed:

(5) $$R = \frac{R_b R_a}{R_a + R_b}$$

(6) $$V_c = \frac{24 R_a}{R_a + R_b}$$

From the equivalent circuit of FIG. 5 it can be seen that no current I will flow in the circuit until the sum of the voltages $V_a + V_c$ is greater than the sum of the voltages $V_{zz} + V_b$. Until this occurs (i.e., $V_a + V_c$ is greater than $V_{zz} + V_b$) no current flows in the circuit and power peak limiting has no effect. However, when the speed of the motor increases to the point where current I flows in the circuit, the voltage $V_{cL}$ is reduced by the voltage drop across resistor R. That is:

(7) $$V_{cL} = V_c - IR$$

(8) $$V_{cL} = V_c - R \left[ \frac{V_c - (V_b + V_{zz} - V_a)}{R + P_1 + Z} \right]$$

(9) $$V_{cL} = \frac{V_c (P_1 + Z)}{R + P_1 + Z} + \left( \frac{R}{R + P_1 + Z} \right) [V_b + V_{zz} - V_a]$$

(10) $$V_{cL} = \frac{V_c (P_1 + Z)}{R + P_1 + Z} + \left( \frac{R}{R + P_1 + Z} \right) \left[ \frac{V_z Z}{R_2} + \frac{24 Z}{R_1} \right] - \left( \frac{R}{R + P_1 + Z} \right) \left( \frac{V_s Z}{R_2} \right)$$

Figure 6:
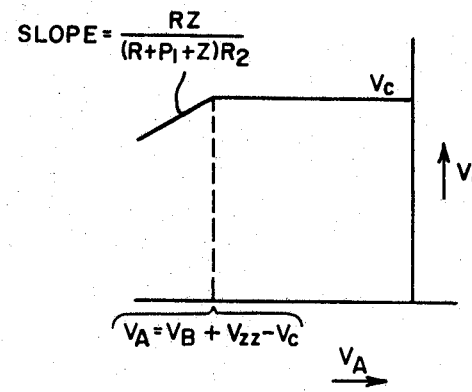
FIG. 6 is a graph illustrating the current limiting effect of the circuit of FIG. 3.

For a given set of potentiometer settings, the only term in Equation 10 which varies is $V_s$. Thus, $V_{cL}$ appearing at the junction of resistors $R_b$ and $R_a$ in FIG. 3, which is the current limit setting, varies proportionally to $V_a$ at the output of operational amplifier 62 as shown in FIG. 6 of the drawings. The slope of the curve in FIG. 6 can be changed by adjusting both Z and $P_1$; however changing $P_1$ has a much larger effect. Thus, it can be seen that the output of the tachometer generator, $V_a$, is compared with a fixed voltage (i.e., $V_b + V_{zz} - V_c$) and when the output from the tachometer exceeds the fixed voltage, the maximum output of the speed controller of FIG. 1 is reduced. The drive speed at which the current limits start to be reduced is adjusted by varying voltage $V_b$ of FIG. 5 which is accomplished by adjusting potentiometer $P_3$ of FIG. 3.

Referring again to FIG. 3, the ramp signal on lead 46 is applied to the speed controller 44 which includes an operational amplifier 76 having an integrating feedback network including capacitor 78, resistor 79 and a limiting network 80. When the motor is rotating in one direction, the voltage at the junction of resistors $R_a$ and $R_b$ is applied to the limiter to limit the output of operational amplifier 76 to current controller 60 in accordance with the speed-torque curve shown in FIG. 2. During regeneration conditions (i.e., when the motor is operating in quadrants II and IV) signals are still applied to the limiter 80 from circuit 54; however they have no effect on the control of the motor since the current through the motor has reversed under the regeneration conditions. The regenerative current-limit signal is the voltage across resistor $R_c$ of FIG. 3 and this voltage signal does not vary as a function of motor speed when the motor is rotating in a clockwise direction because the operational amplifier 62 voltage which is negative now blocks any current flow in diode 70.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a motor control system, a speed controller having an adjustable maximum output, a current controller responsive to current through said motor coupled to the output of said speed controller, thyristor circuitry coupled to the output of said current controller for varying the voltage and current supplied to said motor, signal means for generating a signal which varies as a function of the speed of said motor, means responsive to said signal for generating a voltage which varies proportionally to speed only after the speed of said motor exceeds a predetermined level, and means responsive to said voltage for varying the maximum output of said speed controller.

2. The motor control system of claim 1 wherein the signal means comprises a tachometer generator coupled to the shaft of said motor.

3. The motor control system of claim 1 wherein the means responsive to said signal for generating a voltage which varies proportionally to speed comprises means for comparing said signal with a fixed voltage to produce said voltage proportional to speed only when said signal exceeds said fixed voltage.

4. The motor control system of claim 1 wherein the means responsive to said signal for generating a voltage which varies proportionally to speed comprises an operational amplifier having its input coupled to said signal generating means, a Zener diode and a rheostat connecting the output of said operational amplifier to a source of potential, a voltage divider, means including a unidirectional current device connecting a movable tap on said rheostat to a point on said voltage divider, and means for deriving said voltage which varies proportionally to speed from said point on the voltage divider.

5. The motor control system of claim 4 wherein said means connecting a movable tap on said rheostat to a point on said voltage divider includes a variable resistor whose resistance can be varied to vary the maximum output of said speed controller.

6. The motor control system of claim 4 including a second Zener diode and a second rheostat connecting the output of said operational amplifier to a source of potential, a second voltage divider, means including a second unidirectional current device connecting a movable tap on said second rheostat to a point on said second voltage divider, and means for deriving a voltage which varies proportionally to speed from said point on the second voltage divider as well as said first-mentioned voltage divider.

7. The motor control system of claim 6 wherein said unidirectional current devices are poled to conduct current in opposite directions.

8. The motor control system of claim 6 wherein the first-mentioned Zener diode and rheostat connect the output of said operational amplifier to a source of potential having one polarity, and said second Zener diode and second rheostat connect the output of said operational amplifier to a source of potential of the opposite polarity.

9. The motor control system of claim 8 wherein said first-mentioned voltage divider is connected between a source of reference potential and said source of potential of one polarity, and said second voltage divider is connected between said point of reference potential and said source of potential of the opposite polarity.

10. The motor control system of claim 9 wherein said first-mentioned Zener diode has its anode connected to the output of said operational amplifier while said second Zener diode has its cathode connected to the output of said operational amplifier.

References Cited

UNITED STATES PATENTS

| | | | |
|---|---|---|---|
| 3,407,904 | 11/1968 | Trollope | 318—144 |
| 3,086,156 | 4/1963 | Geissing | 318—308 |
| 2,847,632 | 7/1958 | Harvey et al. | 318—327 |
| 2,801,380 | 7/1957 | Wellington | 318—144 |

ORIS L. RADER, Primary Examiner

L. L. HEWITT, Assistant Examiner

U.S. Cl. X.R.

318—144, 308, 327